United States Patent [19]
Davidian

[11] Patent Number: 5,574,873
[45] Date of Patent: Nov. 12, 1996

[54] DECODING GUEST INSTRUCTION TO DIRECTLY ACCESS EMULATION ROUTINES THAT EMULATE THE GUEST INSTRUCTIONS

[75] Inventor: Gary G. Davidian, Mountain View, Calif.

[73] Assignee: Apple Computer, Inc., Cupertino, Calif.

[21] Appl. No.: 378,071

[22] Filed: Jan. 25, 1995

Related U.S. Application Data

[63] Continuation of Ser. No. 59,472, May 7, 1993, abandoned.

[51] Int. Cl.[6] .............................. G06F 9/42; G06F 9/455
[52] U.S. Cl. .................... 395/376; 395/500; 395/421.03; 395/421.11
[58] Field of Search ................................ 395/375, 500, 395/775, 400, 421.03, 421.08, 421.11

[56] References Cited

U.S. PATENT DOCUMENTS

| | | | |
|---|---|---|---|
| 3,698,007 | 10/1972 | Malcolm et al. | 444/340 |
| 3,972,029 | 7/1976 | Bailey, Jr. | 340/172.5 |
| 4,087,857 | 5/1978 | Joyce et al. | 395/375 |
| 4,262,330 | 4/1981 | Berglund et al. | 364/200 |
| 4,307,445 | 12/1981 | Tredennick et al. | 395/375 |
| 4,429,361 | 1/1984 | Maccianti et al. | 395/775 |
| 4,587,612 | 5/1986 | Fisk et al. | 395/500 |
| 4,635,188 | 1/1987 | Williamson et al. | 395/375 |
| 4,722,050 | 1/1988 | Lee et al. | 364/200 |
| 4,727,480 | 2/1988 | Albright et al. | 364/200 |
| 4,812,972 | 3/1989 | Chastain et al. | 395/375 |
| 4,812,975 | 3/1989 | Adachi et al. | 395/500 |
| 4,839,797 | 6/1989 | Katori et al. | 395/375 |
| 4,972,317 | 11/1990 | Buonomo et al. | 395/375 |
| 4,992,934 | 2/1991 | Portanova et al. | 395/375 |
| 5,070,475 | 12/1991 | Normoyle et al. | 395/375 |
| 5,077,657 | 12/1991 | Cooper et al. | 395/500 |
| 5,101,344 | 3/1992 | Bonet et al. | 395/375 |
| 5,167,023 | 11/1992 | de Nicolas et al. | 395/375 |
| 5,235,686 | 8/1993 | Bosshart | 395/375 |
| 5,247,624 | 9/1993 | Koumoto et al. | 395/375 |
| 5,463,743 | 10/1995 | Galloway | 395/285 |

FOREIGN PATENT DOCUMENTS

| | | |
|---|---|---|
| 2203572 | 3/1987 | United Kingdom. |
| WO88/07718 | 10/1988 | WIPO. |

OTHER PUBLICATIONS

IBM Technical Disclosure Bulletin, vol. 28, No. 10, Mar. 1986, *Threaded Code Interpreter for Object Code*.

Harris and Johnson, "Software Links Math Chip to 68000–Family mPs", Electrical Design News, vol. 31, No. 2, Jan. 1986, pp. 175–192.

Everett and Thorpe, "Single Chip Combines Bit Slice and EPROM", Computer Design, vol. 25, No. 15, Aug. 1986, pp. 61–64.

*Primary Examiner*—William M. Treat
*Assistant Examiner*—Viet Vu
*Attorney, Agent, or Firm*—Fliesler Dubb Meyer & Lovejoy

[57] ABSTRACT

A system for decoding guest instructions includes an emulation routine store in host processor addressable memory having a set of emulation programs beginning at corresponding emulation program addresses. A sequence of guest instructions is stored in the host processor addressable memory, and logic is provided which retrieves a current guest instruction in the sequence and jumps directly to an emulation program address in response to the current guest instruction. The emulation routine store is optimized by dividing it into a dispatch table having a set of dispatch entries and an emulation routine store storing a set of emulation entries. Each dispatch entry includes a plurality of host instructions of the emulation program corresponding to a particular guest instruction. The plurality of host instructions in a dispatch entry includes a host jump instruction which causes a jump to an emulation entry. The emulation entry stores a host instruction routine which includes host instructions to decode and prefetch guest instructions to form an emulation program address to a dispatch entry for a next guest instruction, and to jump directly to the dispatch entry.

39 Claims, 9 Drawing Sheets

FIG.—3

| | |
|---|---|
| 1 | INST 1 (NON-JUMP-ADDRESSING MODE OP) |
| 2 | INST 2 (JUMP-TO EMULATION BLOCK)   DISPATCH TABLE |
| 3 | INST(S) (START EMULATION BLOCK) |
| 4 | DECODE1 MACRO |
| 5 | INST(S) (EMULATION BLOCK)   EMULATION CODE TABLE |
| 6 | DECODE2 MACRO |
| 7 | INST(S) (EMULATION BLOCK) |
| 8 | PRE-FETCH MACRO |
| 9 | INST(S) (EMULATION BLOCK) |
| 10 | DISPATCH MACRO |

FIG.−5

| | |
|---|---|
| 1 | INST 1 (NON-JUMP-SET RETURN ADDR) |
| 2 | INST 2 (JUMP-TO EFFECTIVE ADDR ROUTINE)DISPATCH TABLE |
| 3 | INST(S) (EFFECTIVE ADDR ROUTINE) |
| 4 | INST (MOVE rtn_addr TO ir) |
| 5 | INST(S) (JUMP TO ir)   EMULATION CODE TABLE |
| 6 | INST(S) (START EMULATION BLOCK) |
| 7 | DECODE1 MACRO |
| 8 | INST(S) (EMULATION BLOCK) |
| 9 | DECODE2 MACRO |
| 10 | PRE-FETCH MACRO |
| 11 | INST(S) (EMULATION BLOCK) |
| 12 | DISPATCH MACRO |

FIG.−6

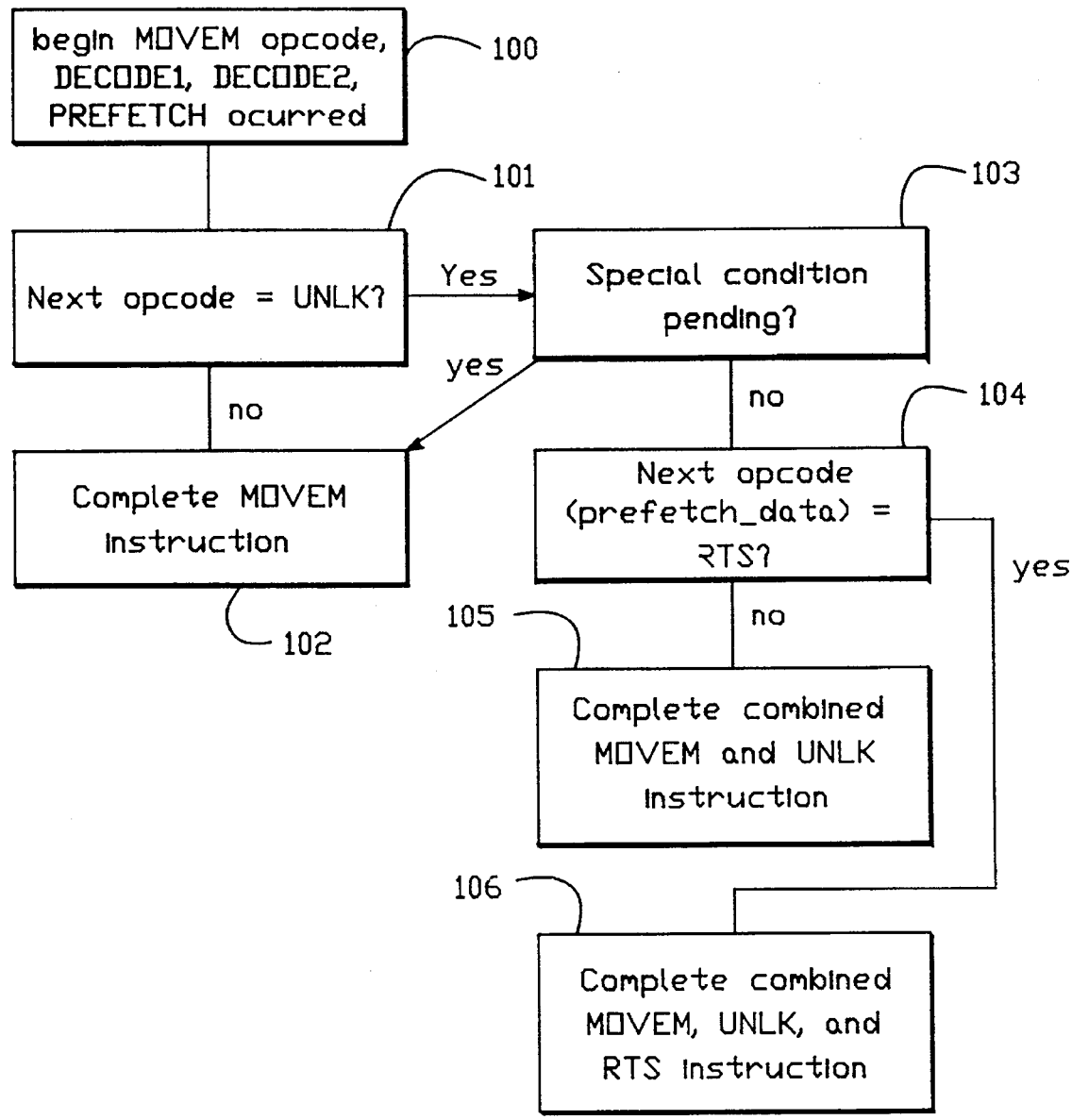
FIG.—7

| | | |
|---|---|---|
| 1st GUEST | 1 | INST 1 |
| | 2 | INST 2 |
| | 3 | INST(S) (OPCODE EXTENSION NEEDED) |
| 2nd GUEST | 4 | PREFETCH FROM PC TO GPR (ADV PC) |
| | 5 | TEST GPR FOR SEQUENCE (SAVE) |
| | 6 | USE EXTENSION IN PREFETCH_DATA |
| | 7 | INST(S) |
| | 8 | DECODE1 MACRO ON GPR |
| | 9 | DECODE2 MACRO ON GPR |
| | 10 | INST(S) |
| 3rd GUEST | 11 | PREFETCH MACRO INTO PREFETCH DATA |
| | 12 | CHECK FOR SPECIAL CONDITIONS |
| | 13 | BRANCH IF SEQUENCE AND NO SPECIAL CONDITION TO 16 |
| | 14 | INST(S) |
| | 15 | DISPATCH MACRO (FOR 2nd GUEST) |
| | 16 | INST(S) |
| | 17 | TEST PREFETCH_DATA FOR SEQUENCE |
| | 18 | BRANCH IF SEQUENCE TO 25 |
| | 19 | INST(S) |
| | 20 | DECODE1 MACRO |
| | 21 | DECODE2 MACRO |
| | 22 | INST(S) |
| 4th GUEST | 23 | PREFETCH MACRO |
| | 24 | DISPATCH MACRO (FOR 3rd GUEST) |
| | 25 | INST(S) |
| 4th GUEST | 26 | FETCH OPCODE FOR RTS |
| | 27 | DECODE1 MACRO |
| | 28 | DECODE2 MACRO |
| | 29 | INST(S) |
| 5th GUEST | 30 | PREFETCH MACRO |
| | 31 | PREFETCH MACRO (FOR 4th GUEST RETURN) |

FIG.—8

| | | |
|---|---|---|
| 1st GUEST | 1 | INST 1 |
| | 2 | INST 2 |
| 2nd GUEST | 3 | TEST PREFETCH_DATA FOR SEQUENCE |
| | 4 | BRANCH IF SEQUENCE AND NO SPECIAL COND. TO 11 |
| | 5 | INST(S) |
| | 6 | DECODE1 MACRO |
| | 7 | DECODE2 MACRO |
| | 8 | INST(S) |
| 3rd GUEST | 9 | PREFETCH MACRO |
| | 10 | DISPATCH MACRO (2nd GUEST) |
| 3rd GUEST | 11 | PREFETCH MACRO |
| | 12 | INST(S) |
| | 13 | DECODE1 MACRO |
| | 14 | INST(S) |
| | 15 | DECODE2 MACRO |
| 4th GUEST | 16 | PREFETCH MACRO |
| | 17 | DISPATCH MACRO (3rd GUEST) |

FIG.—9

| | | |
|---|---|---|
| 1st GUEST | 1 | TEST FOR REPEAT |
| | 2 | JUMP TO 3 |
| (3rd GUEST) | 3 | INST(S) |
| | 4 | DECODE1 MACRO |
| | 5 | PREFETCH MACRO |
| | 6 | INST(S) |
| | 7 | BRANCH IF REPEAT TO 11 |
| | 8 | DECODE2 MACRO |
| | 9 | INST(S) |
| | 10 | DISPATCH MACRO ((2+N)th GUEST) |
| | 11 | TEST FOR REPEAT |
| | 12 | BRANCH IF SPECIAL CONDITION TO 8 |
| | 13 | INST(S) |
| | 14 | DECODE1 MACRO |
| ((3+N)th GUEST) | 15 | PREFETCH MACRO |
| | 16 | INST(S) |
| | 17 | BRANCH IF REPEAT TO 11 |
| | 18 | BRANCH TO 8 |

FIG.−10

DECODING GUEST INSTRUCTION TO DIRECTLY ACCESS EMULATION ROUTINES THAT EMULATE THE GUEST INSTRUCTIONS

This application is a Continuation of Ser. No. 08/059,472, filed May 7, 1993, now abandoned.

BACKGROUND OF THE INVENTION

1. Field of the Invention

The present invention relates to the emulation of software written for a given computer on a different computer which executes a different set of instructions; and more particularly to a system for decoding guest instructions into host instructions by the host computer.

2. Description of the Related Art

Central processing units for computers are designed to execute a specific set of instructions unique to a particular central processing unit. Thus, a microprocessor in one family, such as the Motorola 68000 family, executes software written in a language unique to the 68000 family, while processors in the Intel 80286 family execute software written with another language which is unique to that family of processors. A need often arises to execute software written for a particular processor in a host processor that utilizes a different language. For the purposes of this application, the language for the host CPU is based on "host instructions", while the language for other CPUs are referred to as "guest instructions".

Because of the large body of software written for existing processors, such as the Motorola 68000 series, new processors which are designed often attempt to emulate the 68000 series processors in software. This emulation process involves first decoding the 68000 series guest instructions into a sequence of host instructions which accomplish the result intended by the guest instruction. The routines needed to emulate a given instruction are stored in a host addressable table. For instance, in one prior art system, each guest instruction is used to generate a jump table pointer which points to a table that includes one entry for each of the possible combinations of operational code and addressing mode for a guest instruction. The jump table stores a pointer to the particular code segment adapted to a particular code combination. See, ARRANGEMENT FOR SOFTWARE EMULATION, International Application No. PCT/GB87/00202; invented by MacGregor.

A disadvantage of this prior art technique arises because of the delay involved in composing a jump table pointer based on the guest instruction, looking up a second pointer in the jump table, and then accessing the emulation segment. Because of data access latencies and the like, this can significantly slow down the emulation routine.

Accordingly, it is desirable to provide an emulation system which enhances the performance of the host processor in emulation of guest instructions.

SUMMARY OF THE INVENTION

The present invention provides an arrangement for decoding guest instructions based on direct access to the instructions in the emulation program in response to guest instructions, and distribution of the functions involved in prefetching and decoding guest instructions within the emulation programs themselves. This approach minimizes the penalty involved in retrieving an emulation program, and absorbs the access latencies involved, to present a highly efficient decoding method.

Thus, the invention can be characterized as a system for decoding guest instructions which includes an emulation routine store in the host processor addressable memory having a set of emulation programs beginning at corresponding emulation program addresses. A sequence of guest instructions is stored in the host processor addressable memory, and logic is provided which retrieves a current guest instruction in the sequence and jumps directly to an emulation program address in response to the current guest instruction.

The emulation routine store is optimized according to the present invention by dividing it into a dispatch store having a set of dispatch entries and an emulation routine store. Each dispatch entry in the set includes a plurality of host instructions of the emulation program corresponding to a particular guest instruction. The emulation routine store stores a set of emulation entries beginning at corresponding emulation store addresses, each emulation entry in the set including a host instruction routine for the emulation program. In this aspect, the plurality of host instructions in a subset of the set of dispatch entries includes a host jump instruction which causes a jump upon execution by the host processor to an emulation store address of a corresponding emulation entry. Further, the host instruction routines in a subset of the set of emulation entries include host instructions which upon execution by the host processor form an emulation program address to a dispatch entry in response to a next guest instruction and jump directly to the dispatch entry. In this manner, each emulation program in the emulation store includes a plurality of instructions in the dispatch store and a host instruction routine in the emulation routine store.

According to another aspect of the invention, the system includes a guest instruction pointer store for a guest instruction pointer indicating a guest instruction address in the sequence of guest instructions, a prefetched guest instruction store for a guest instruction read from the sequence of guest instructions in response to the guest instruction pointer, and an emulation program pointer store for an emulation program address formed in response to the current guest instruction read from the prefetched guest instruction store.

In this aspect, the emulation programs include a first segment of host instructions which upon execution by the host processor form an emulation program address in the emulation program pointer store in response to the current guest instruction in the prefetch guest instruction store. Also, the emulation programs include a second segment of host instructions which, upon execution by the host processor, reads a next guest instruction from an address indicated by the guest instruction pointer into the prefetched guest instruction store. Finally, a third segment of host instructions is included in the emulation programs, which upon execution by the host processor causes a jump to the emulation program indicated by the emulation program address in the emulation program pointer store.

In a preferred system, the third segment includes a final instruction of the emulation program which causes a jump to the emulation program address for the next guest instruction.

In a further aspect of the invention, the plurality of instructions in a subset of the dispatch table entries include a first instruction relevant to guest instruction addressing mode functions, and a second instruction identifying an emulation table address of the corresponding emulation entry. This provides for immediate execution of addressing mode functions, followed by a jump to a routine unique to the operation indicated by the guest instruction. By including at least two instructions in the dispatch table, memory access latencies involved in decoding a guest instruction are significantly reduced. Further, by providing at least one instruction in the dispatch table that is relevant to instruction addressing mode, the emulation code block stored in the emulation table can be significantly simplified.

Where the addressing mode of a particular guest instruction is more complex, the plurality of instructions in a particular dispatch table entry includes a first instruction which identifies an emulation table address of the corresponding emulation table entry, and writes such address to a return address store in the host processor. A second instruction in the dispatch table entry causes a jump to a guest effective address routine, and the guest effective address routine includes a host instruction which causes a jump to the emulation table address stored in the return address store by the first instruction.

Thus, a highly efficient method for decoding guest instructions on a host processor, using a specialized stores of instruction sequences, and specific sequences of instructions, is provided. The alignment and method of indexing the store of instruction sequences contribute to high speed decoding of the guest instructions. In particular, a single host instruction can be used to index the table. Further optimizations are provided by aligning the specialized table of instruction sequences on address boundaries, such as a 512K byte boundary within a 2 Megabyte range that simplify the decoding of guest instructions into a table address.

Because of the direct access to instructions in the dispatch store, and other optimizations, the performance of the present invention is significantly improved over prior art emulation techniques.

Other aspects and advantages of the present invention can be seen upon review of the figures, the detailed description, and the claims which follow.

BRIEF DESCRIPTION OF THE FIGURES

FIG. 5 illustrates an emulation program according to the present invention.

FIG. 6 illustrates an alternative emulation program according to the present invention.

FIG. 7 is a flow chart of an emulation program which is optimized for a three opcode sequence, which may be common in guest programs.

FIG. 8 illustrates an emulation program according to the present invention for a guest instruction which may be a first instruction of a three instruction sequence of guest instructions.

FIG. 9 illustrates an emulation program according to the present invention for a guest instruction, which may be the first guest instruction in a two opcode sequence.

FIG. 10 illustrates an emulation program according to the present invention for a guest instruction, which may be repeated.

DESCRIPTION OF THE PREFERRED EMBODIMENTS

A detailed description of preferred embodiments of the present invention is provided with respect to FIGS. 1–10.

I. Emulator System

Figure 1:
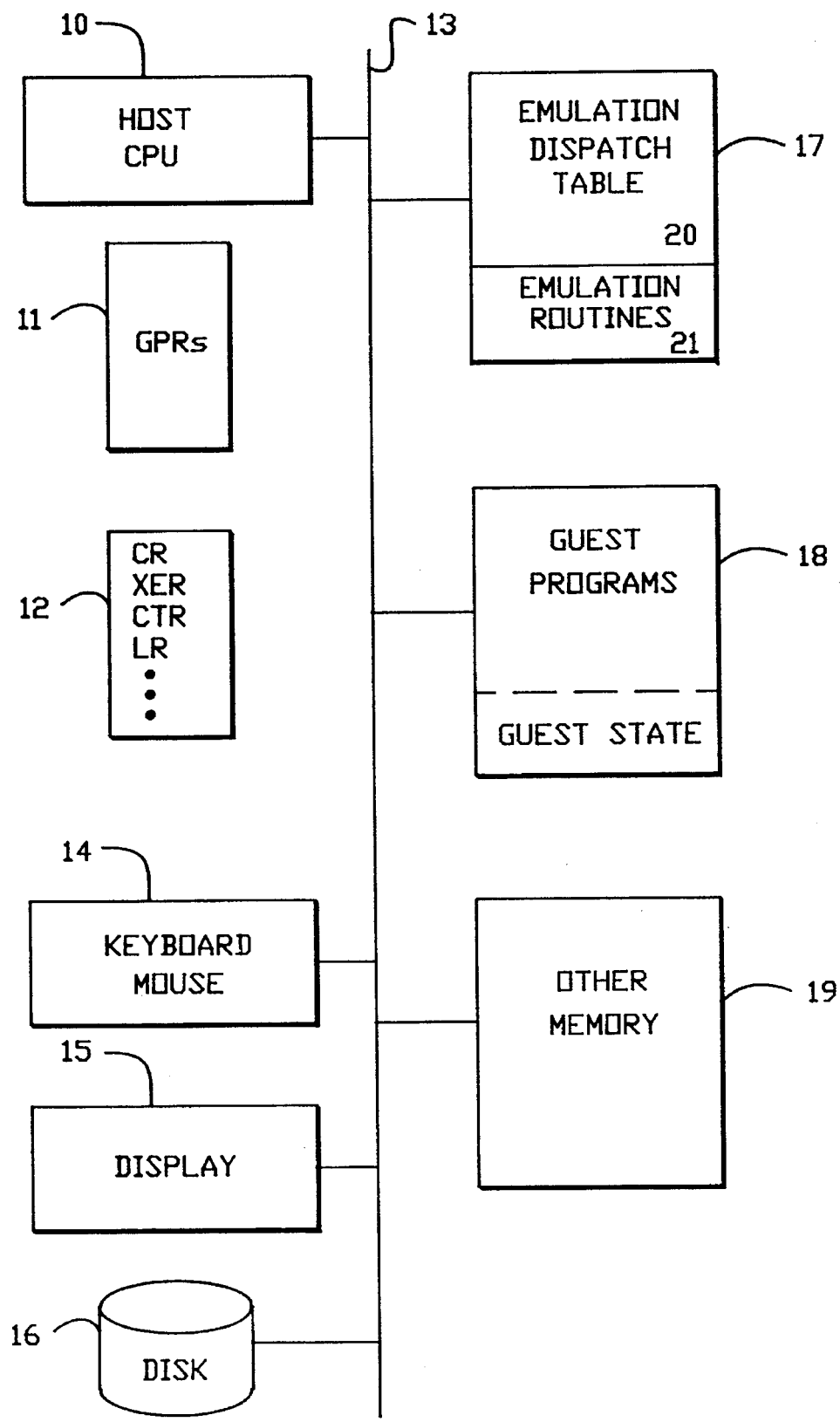
FIG. 1 is a schematic block diagram of a computer system implementing the present invention.

FIG. 1 illustrates a host processor which is adapted to emulate guest instructions according to the present invention. The host processor includes a host CPU 10 which executes host instructions. Coupled with the host CPU 10 are a set of general purpose registers 11, and a set of special purpose registers 12, implemented as commonly known in the industry as part of an integrated circuit microprocessor, incorporating the CPU 10.

The host CPU 10 is coupled to a system bus 13. The bus is also coupled to input devices such as a keyboard and mouse 14, a display system 15, and a memory system 16 such as a disk drive.

The host processor system also includes host addressable memory, which includes an emulation program store 17, a sequence of guest instructions in a guest program store 18, and other memory 19. The emulation program store 17, according to a preferred embodiment of the present invention, includes an emulation dispatch store 20, and a set of emulation routines 21.

Figure 2:
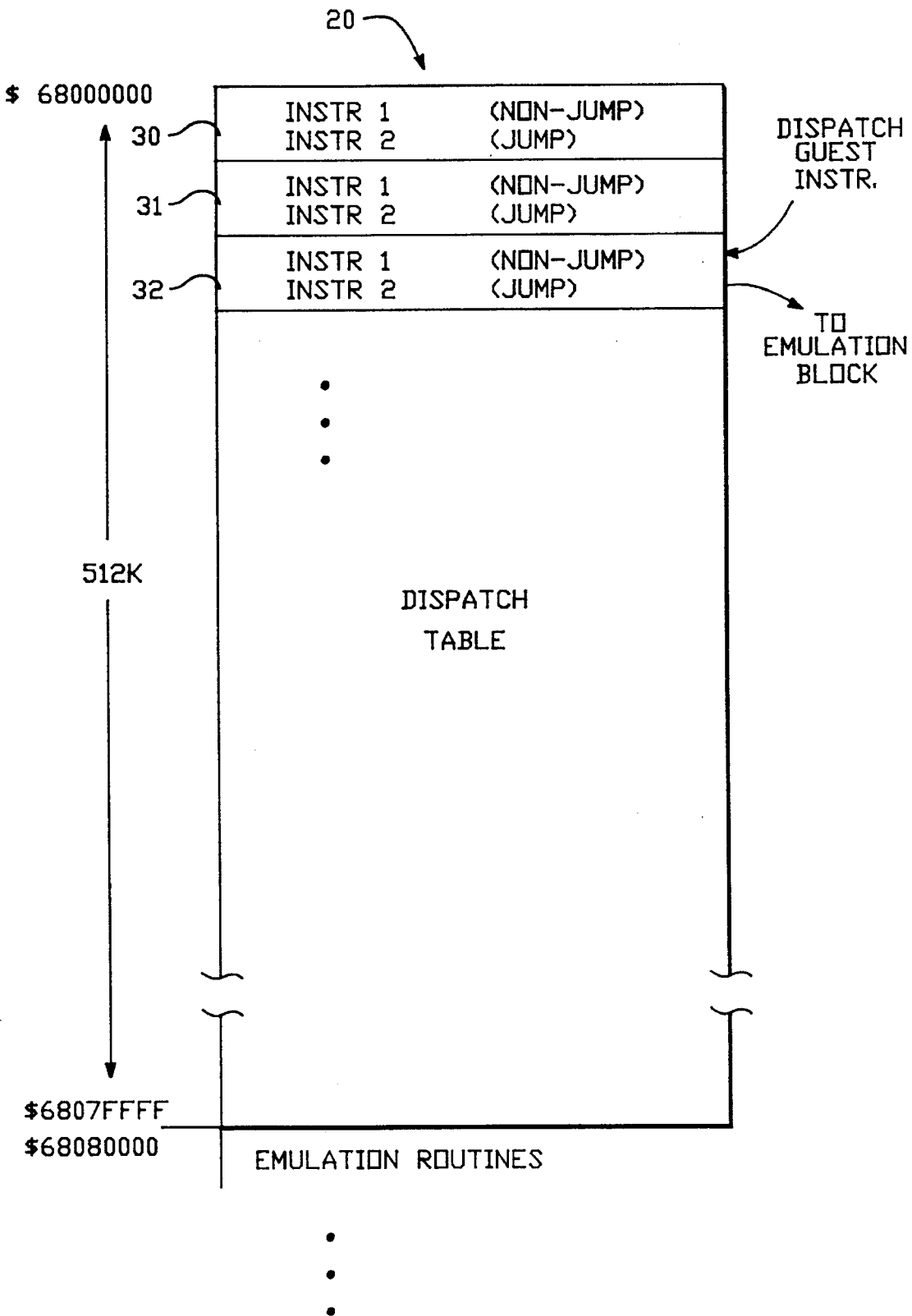
FIG. 2 is a diagram of a dispatch store according to the present invention.

FIG. 2 illustrates the structure of a preferred embodiment of the emulation dispatch store 20. The emulation dispatch store 20 includes a set of instruction pairs, e.g., pair 30, pair 31, pair 32. Each pair includes a host non-jump instruction and a host jump instruction.

According to the preferred embodiment, the dispatch store is an indexed table of 65536 pairs of host instructions, which correspond to the entry points for emulation programs to emulate each of the 65536 possible guest instruction encodings for a Motorola 68020 microprocessor assembly language. The first instruction of the pair will generally perform some operation related to a source operand fetching or addressing. The second instruction of the pair is generally a branch instruction to an emulation routine which resides outside of the dispatch store in the emulation routine store 21. Since each pair of instructions will occupy 8 bytes, the total size of the dispatch store is 512K bytes. The dispatch store may be located, for instance, at addresses (hex) 68000000 through (hex) 6807FFFF.

The alignment of the beginning of the store is important. In a preferred system, the store starts at either the beginning of a 2 Megabyte address boundary, or a 512 Kilobyte address boundary past the 2 Megabyte boundary. By having this 512K byte block aligned onto a 512K byte address, block address translation registers can be used to perform address translation of a fairly randomly accessed block of code and eliminate potential thrashing in translation lookaside buffers.

The 512K byte alignment also allows a single instruction to index the dispatch store using a sixteen bit 68020 opcode multiplied by 8. Thus, a single host instruction can shift a 68020 opcode left by 3 bits (multiplied by 8), and insert it into the address of the base of the table to form the address of a dispatch table entry for that opcode.

By having this table start in the first 1 Megabyte of a 2 Megabyte aligned boundary, where the second 1 Megabyte of addresses will cause an exception if accessed, it is possible to use an additional address bit to assist in the detection of address errors as described below.

As illustrated in FIG. 2, the host CPU 10 executes a host instruction in order to dispatch a guest instruction by accessing the first instruction in an instruction pair in the dispatch store. The first instruction executes, and then a second instruction in the dispatch pair is executed. This second instruction includes a jump instruction which goes to an emulation block in the emulation routine store 21.

Figure 3:
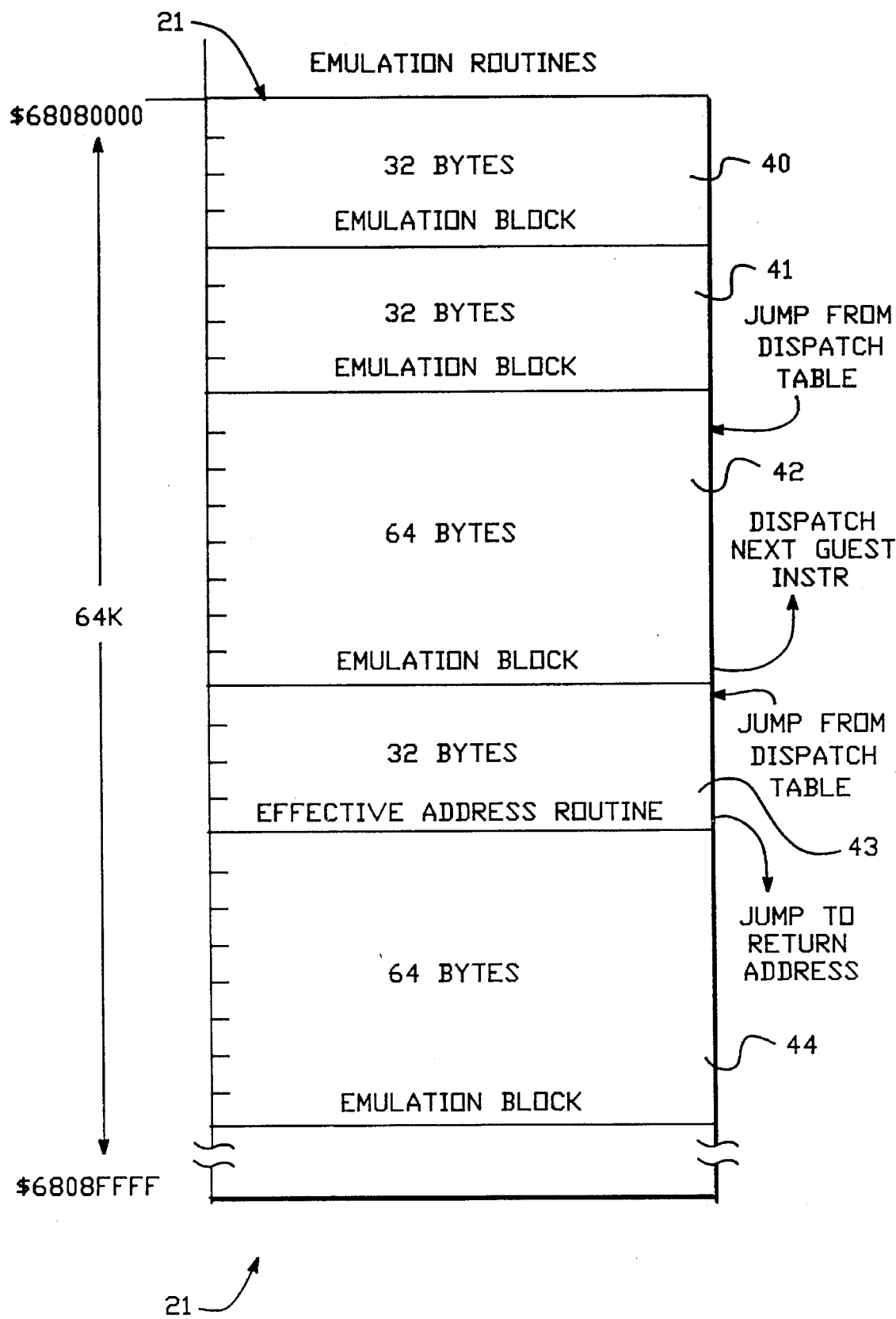
FIG. 3 is a diagram of an emulation routine store according to the present invention.

FIG. 3 illustrates the implementation of the emulation routine store 21. The emulation routines are allocated to a 64K block of bytes for host instruction routines to which the jump instruction in the dispatch entry branches. In general, the first two host instructions in an emulation program reside in an entry in the dispatch store, while the remaining instructions, which are referred to as emulation routines, reside in the emulation routine block of code. This block may be located, for instance, at addresses (hex) 68080000 through (hex) 6808FFFF.

As above, the alignment of the block of code for the emulation routines is also important. In a preferred system, it needs to start at the beginning with 64K byte boundary.

During emulation, it is frequently desirable to compute the address of a guest instruction within the emulated block, such as by computation of a PC relative address. The host architecture in a preferred system may not provide an instruction to compute a PC relative address. By storing the address of the beginning of the emulation routine block so that it has zeros in the 16 least significant bits in a host register, referred to as code_ptr, a computation of the address of any label within this 64K byte block of code can be optimized by using the value in code_ptr as a code base by doing an OR immediate, with a 16 bit immediate value as the offset.

Within the 64K byte block of emulation routine code, there is additional attention paid to code alignment. In particular, the emulation blocks are aligned into blocks which match the processor caching routing used to retrieve the code. In a preferred system, a processor cache uses 32 byte cache blocks in a cache line of 64 bytes, and the emulation blocks are packed into aligned 32 and 64 byte blocks.

Thus, as illustrated in FIG. 3, the emulation routine store 21 may include a plurality of emulation routines including emulation block 40, emulation block 41, emulation block 42, emulation block 43, emulation block 44, etc. Each of these blocks 40–44 is either a 32 or 64 byte block.

A particular emulation block, e.g., block 42, is entered by a jump from the dispatch table, and ends with an instruction to dispatch the next guest instruction.

As illustrated in FIG. 3, some emulation blocks may include effective address calculation routines, such as block 43. Such effective address routines are entered by a jump from the dispatch table as described below, and end with a jump to a return address of an emulation block within the emulation routine memory.

Figure 4:
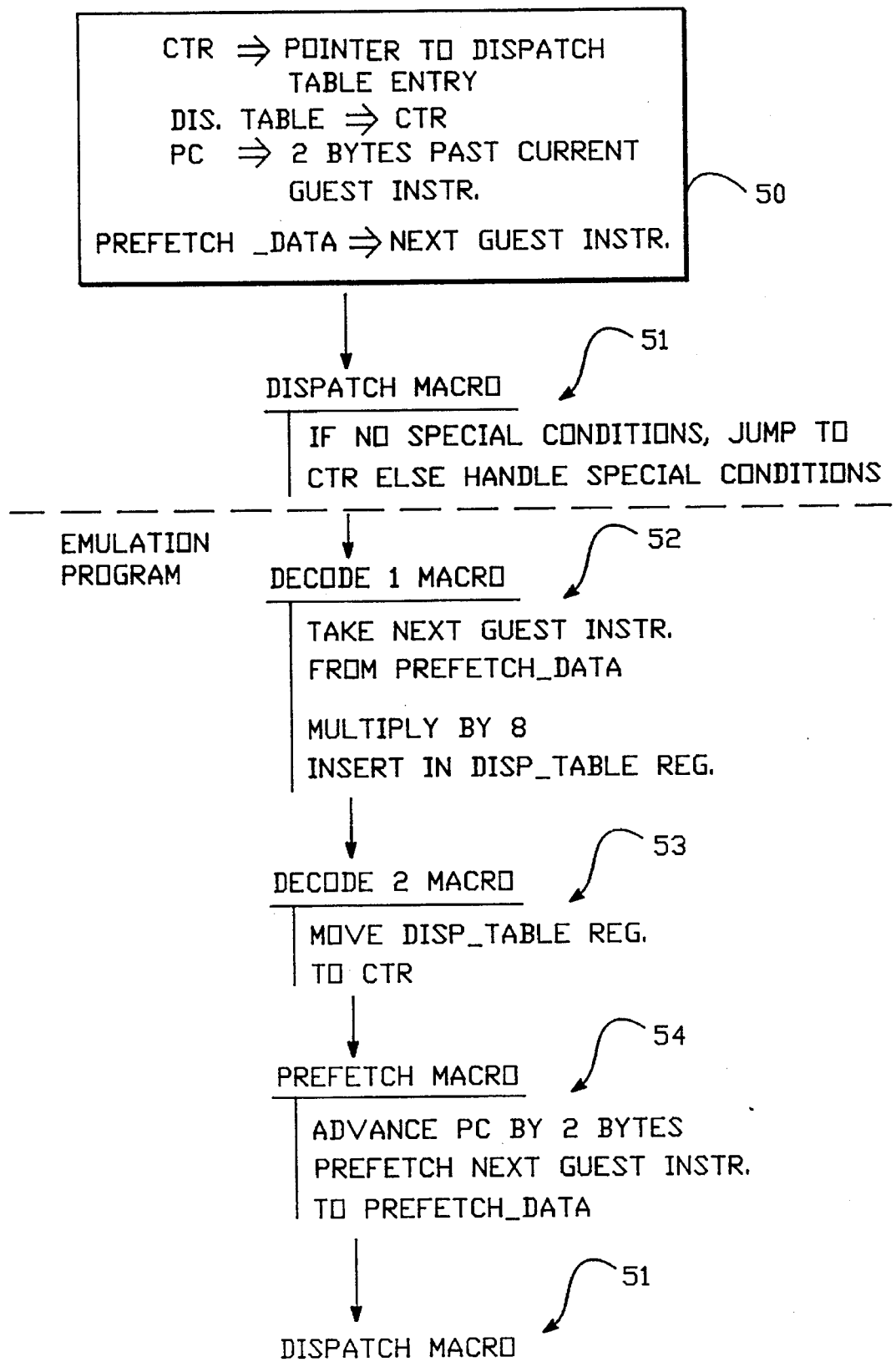
FIG. 4 is a flow chart illustrating the decoding method according to the present invention.

FIG. 4 illustrates the emulation decoding process according to the present invention. As mentioned above, the host processor 10 shown in FIG. 1 includes a plurality of special purpose and general purpose registers. The general purpose register disp_table stores a pointer to a dispatch table entry. Also, at this point in the decoding sequence, a special purpose register labelled ctr will contain the same value as disp_table. A general purpose register labelled pc stores a guest instruction pointer 2 bytes past a current guest instruction. A general purpose register labelled prefetch_data stores a next guest instruction, as indicated at block 50. As mentioned above, the emulation routines include host instructions distributed within the routines to carry out the decoding process. Thus, each emulation program will include a DISPATCH macro, generally 51, which does inter-instruction processes which may be required between guest instructions, and causes a jump to the dispatch table entry indicated by the pointer in register ctr. The emulation program also includes a macro referred to as DECODE1 macro 52, which takes the next guest instruction from the prefetch_data register, multiplies that instruction by 8, and inserts the results in the general purpose register labelled disp_table so that it forms an address of a dispatch table entry.

A next macro 53 within an emulation program referred to as DECODE2 macro, copies the value in the disp_table register to the special purpose register ctr.

A final macro referred to as PREFETCH macro 54 is included within an emulation program. The PREFETCH macro 54 advances the guest instruction pointer in register pc by 2 bytes, then causes a prefetch of the next guest instruction from the address indicated by the pointer in register pc and places the prefetched instruction in the general purpose register prefetch_data. The final macro in a given emulation routine is the DISPATCH macro 51. Thus, as illustrated in FIG. 4, an emulation program for a particular guest instruction begins immediately after the jump instruction of the DISPATCH macro 51.

The structures of alternative emulation programs, according to the present invention, are shown in FIGS. 5 and 6. FIG. 5 illustrates the general case. Line 1 is the first instruction INST1 stored in a dispatch entry in the dispatch store. Generally, this is a non-jump instruction relevant to addressing mode of the guest instruction. Line 2 stores the second instruction INST2 stored in the dispatch entry. Generally, this is a jump to a block of code in the emulation routine store.

Line 3 corresponds to the instruction or instructions at the beginning of an emulation block. Within an emulation program, the DECODE1 macro occurs next, as indicated at line 4. After the DECODE1 macro in line 4, an instruction or instructions may be included relevant to emulation of the guest instruction. Next, a DECODE2 macro is executed as indicated at line 6. The DECODE2 macro in line 6 may be followed by other instructions indicated by line 7, relevant to the decoded guest instruction. Next in the sequence, a PREFETCH macro of line 8 is executed. The PREFETCH macro may be followed by an instruction or instructions represented by line 9 of the emulation program. Finally, the DISPATCH macro is executed as indicated at line 10. The first instruction of the DISPATCH macro is a conditional jump to the value in the ctr register, if no special conditions are pending.

FIG. 5 illustrates the distribution of the DECODE1, DECODE2, PREFETCH, and DISPATCH macros within an emulation program. It will be appreciated by those of skill in the art that the presence of instructions between such macros may or may not occur. However, by distributing the macros among the instructions of the emulation program, the programmer can take advantage of any data or instruction access latency occurring in the program to improve performance.

FIG. 6 illustrates an emulation program which is used when a single instruction in a dispatch entry in the dispatch table is insufficient to handle addressing mode issues. In this case, the first instruction, INST of the dispatch entry, is shown in line 1. This instruction is a non-jump instruction which sets the value of a return address in a host register labelled rtn_addr which is a general purpose register in a preferred embodiment of the present invention. The next instruction in line 2 of FIG. 6 is the instruction INST2 in the dispatch entry. This instruction causes a jump to an effective address routine stored in the emulation routine store, as illustrated at element 43 of FIG. 3.

Line 3 of FIG. 6 illustrates the beginning instructions of the effective address routine. Line 4 of the program shown in FIG. 6 is an instruction which results in moving the return address from the register rtn_addr to a special purpose register lr, which is used for jump addresses by the host processor. This may or may not be necessary in a given implementation of the present invention. Line 5 of the program illustrates the final instruction of the effective address routine, which requires a jump to the return address stored in the register lr. This jump results in execution of the instructions illustrated at line 6, starting the emulation block for the guest instruction. This emulation block will include the DECODE1 macro, line 7, possibly other instructions, line 8, the DECODE2 macro, line 9, the PREFETCH macro, line 10, possibly other instructions, line 11, and the DISPATCH macro, line 12, as described above with respect to FIG. 5.

II. Multi-Instruction Sequence Emulation

The emulation system according to the present invention may be further optimized for sequences of guest instructions which are expected to be relatively common in the guest code to be emulated. For instance, the move multiple opcode MOVEM in the 68020 architecture may be a first instruction in a three instruction sequence, including MOVEM, unlink UNLK, and return-to-subroutine RTS, which commonly occurs in many programs written for the 68020 processor. Thus, FIG. 7 illustrates how an emulation program for the MOVEM opcode may be implemented according to the present invention.

The MOVEM emulation program, after dispatching, as described above, will include a section which begins execution of the opcode, including the DECODE1, DECODE2, and PREFETCH macros (block 100). After the prefetching, the next opcode (2nd) can be tested to determine whether it is the UNLK opcode (block 101). If it is not, then the expected sequence is not occurring, and the MOVEM instruction is completed (block 102).

If at block 101, the emulation program detects a UNLK instruction, then the algorithm tests whether special conditions are pending, such as an interrupt, or instruction tracing condition (block 103). If a special condition is pending, then the algorithm branches back to complete the MOVEM instruction at block 102, because the special condition must be handled between guest instructions.

If no special condition is pending at block 103, then the next opcode (3rd) is tested (block 104). If the third opcode is not the RTS instruction, then the predicted three instruction sequence is not found, and the algorithm branches to complete a combined MOVEM and UNLK instruction program (block 105). If the next opcode is found to be RTS in block 104, then the algorithm branches to complete the combined MOVEM, UNLK, and RTS instruction sequence (block 106).

Thus, it can be seen that for the combined sequence, the overhead of the decoding and dispatching logic for UNLK and RTS is bypassed.

FIG. 8 illustrates an emulation program for the MOVEM instruction, or a similar instruction which may be the first instruction in a three guest instruction sequence. As illustrated in FIG. 8, the first guest instruction is dispatched by the emulation program of the previous instruction, as described above. Thus, the first guest instruction emulation program includes instruction 1 on line 1 and instruction 2 on line 2 which are found in the dispatch table. Instruction 2 on line 2 causes a jump to line 3 of the program, found in the emulation program store. These instructions for the MOVEM instruction will need a MOVEM opcode extension. This opcode extension will have been loaded by the previous emulation program in the prefetch_data register, as it consists of the next two bytes in the guest instruction sequence. Thus, an additional prefetch is needed to be executed to find the next guest instruction. So, the pc value is then incremented by two bytes and a prefetch operation to fetch the instruction from the address pointed to by the register pc to a general purpose register gpr, other than the prefetch_data register is executed (line 4). The emulation program tests whether the second guest instruction, which is now indicated by the value in the general purpose register is the expected second guest instruction of the sequence and saves the result (line 5).

Line 6 of the program indicates that the extension data is used by the emulation program. An additional instruction or group of instructions may be executed (line 7). Lines 8 and 9 of the program illustrate that the DECODE1 and DECODE2 macros are executed. Line 10 indicates that an instruction or instructions may be interspersed between the DECODE2 macro and the PREFETCH macro on line 11. After the DECODE1, DECODE2 and PREFETCH macros are executed, a check for special conditions, such as an interrupt or instruction tracing mode, is made (line 12). As indicated at line 13, the program will branch if the sequence had been detected in line 5, and no special conditions were found. If the sequence is not detected, then instructions indicated at line 14 are executed to complete emulation of the MOVEM instruction. Finally, the DISPATCH macro is executed to jump to the dispatch table entry for the second guest instruction (line 15).

In FIG. 8, if the branch is taken at line 13, then the program moves to line 16. At this point, instructions may be executed. Line 17 of FIG. 8 shows that the program then tests for the third expected guest instruction in the sequence by looking at the value in the prefetch_data register. As indicated at line 18, the algorithm will branch if the sequence is detected. If not, the instructions indicated by line 19 are executed to carry out a combined two instruction sequence. The DECODE1 and DECODE2 macros are executed, as indicated at lines 20 and 21. Line 22 indicates the possibility of interspersed instructions for the emulation program between the macros. At line 23, the PREFETCH_ macro is executed to prefetch the fourth guest instruction in the sequence. Next, the DISPATCH macro is executed to jump to the dispatch table entry for the third guest instruction in the sequence (line 24).

If at line 18 of the program the branch was taken, then for the program illustrated in FIG. 8, line 25 is executed. This line indicates that instructions in the emulation program are executed. Line 26 illustrates that an additional fetch operation is executed to retrieve the fourth guest instruction into the prefetch_data register. For the RTS instruction in this sequence, the PREFETCH macro is replaced by instructions to retrieve the target of the return from subroutine instruction into the prefetch_data register.

Lines 27 and 28 correspond to the standard DECODE1 and DECODE2 macros in the emulation system. Line 29 indicates the presence of interspersed instructions to complete the combined three guest instruction emulation. Line 30 illustrates the presence of the PREFETCH macro to retrieve the fifth guest instruction in the sequence. Line 31 ends up the routine with a DISPATCH macro which causes a jump to the dispatch table entry of the fourth guest instruction in the sequence.

Thus, it can be seen that the emulation program includes logic which bypasses the dispatching of instructions in the detected sequence. This greatly reduces the overhead involved in executing common guest instruction sequences.

FIG. 9 illustrates an emulation program for a sequence of guest instructions, such as a repeated sequence. As can be seen in FIG. 9, the first guest instruction is dispatched by the previous emulation program, and instructions 1 and 2 from the dispatch table entry are executed (lines 1 and 2). Instruction 2 causes a jump to the emulation program store and execution of the sequence beginning with line 3.

Line 3 in FIG. 9 illustrates that the emulation program will include instructions that test the prefetch_data register for the sequence. This register will have been filled with the second guest instruction in the sequence by the PREFETCH macro of the previous guest instruction.

As indicated on line 4, the algorithm branches if the sequence is detected to line 11. If the sequence is not detected, then the algorithm continues with instructions indicated at line 5 to complete the emulation program. The emulation program would also include the DECODE1 and DECODE2 macros as indicated at lines 6 and 7. Line 8 indicates that instructions of the emulation program may be interspersed with the macros involved in decoding and prefetching instructions. At line 9, the PREFETCH macro is executed to retrieve the third guest instruction in the sequence. Line 10 is the DISPATCH macro which jumps to the dispatch table entry for the second guest instruction. If at line 4, the branch was taken, a PREFETCH macro is executed to retrieve the third guest instruction. This macro is necessary because the DECODE1, DECODE2, and PREFETCH macros of lines 6, 7, and 9 were bypassed by the detection of the sequence of guest instructions. Then, the instructions at line 12 are executed for the combined emulation program. Next, the emulation program will include a DECODE1 macro as indicated at line 13. Line 14 indicates the possible distribution of instructions within the emulation program. Line 15 indicates the DECODE2 macro which loads the ctr register with the address of the dispatch entry for the third guest instruction. Line 16 indicates the PREFETCH macro for retrieving the fourth guest instruction in the sequence. Line 17 is the DISPATCH macro which causes a jump to the dispatch table entry for the third guest instruction.

Thus, FIG. 9 illustrates the bypassing of decode and dispatch logic in the emulation program for a common opcode sequence, such as a repeated pair of opcodes.

FIG. 10 illustrates a program which is optimized for decoding repeated sequences of instructions. In this example, the first instruction on line 1 is a test for repeat and the second instruction is a jump from the dispatch table entry to an emulation routine on line 3 as shown in FIG. 10. Thus, lines 1 and 2 of FIG. 10 correspond to the dispatch table entry for the first guest instruction.

At line 3, the routine executes an instruction or instructions relevant to the guest instruction being decoded. Next, the DECODE1 macro is executed, followed by the PREFETCH macro for the third guest instruction (lines 4 and 5). After the PREFETCH macro, an instruction or instructions for emulating the guest instruction are executed (line 6). In line 7, the algorithm then branches if a repeat had been detected to line 11 of the routine. If no repeat had been detected, then the DECODE2 macro is executed, as indicated at line 8. This macro is followed by instructions indicated at line 9 which wrap up the emulated guest instruction. Line 10 indicates the DISPATCH macro is executed. This results in dispatching of the (2+N) th guest instruction, where "N" is the number of times that a repeated instruction had been detected. Thus, if no repeat is detected at line 7, then the second guest instruction is dispatched at line 10.

If the branch had been taken at line 7, then the algorithm goes to line 11 to test for a repeat once again. Thus, the second and third guest instructions can be compared to determine whether a repeat has occurred at this point, because the PREFETCH macro on line 5 had prefetched the third guest.

In line 12 of the routine, a branch is taken if a special condition is detected to line 8 to complete the execution of the current guest instruction. In line 13, additional instructions are executed to handle the combined execution of repeated instructions. At line 14, the DECODE1 macro is executed, followed by the PREFETCH macro in line 15. The PREFETCH macro on line 15 prefetches the (3+N) th guest instruction, where "N" again is the value indicating the number of times that a repeat had been detected.

At line 16, instructions are executed relevant to emulation of the guest instruction sequence. At line 17, the algorithm branches if a repeat had been detected at line 11 back to line 11. The algorithm continues in this loop from lines 11 through 17, until the repeated sequence ends. Line 18 of the routine causes a branch to line 8 to wrap up the sequence if the branch at line 17 is not taken.

III. Details of a 68020 Emulation on a Power Architecture

The present invention may be further understood with reference to or detailed information concerning emulation of the Motorola 68020 microprocessor guest code on an IBM POWER microprocessor architecture. Thus, the internal design of a 68020 emulator for the POWER architecture processor is provided below.

POWER Registers

The POWER architecture defines 32 general purpose 32 bit registers (actually they can be 64 bits, but the emulator just uses the 32 bit architecture) referred to as r0 . . . r31. There are 32 double precision 64 bit floating point registers referred to as f0 . . . f31, which are not used at all by the emulator. There are 4 additional special purpose 32 bit registers used by the emulator, they are called cr (condition register), xer (exception register), ctr (counter), and lr (link register).

In the source code, the general purpose register are referred to by names, instead of r0 . . . r31. These name will be used in the remainder of the document. The current assignments are as follows, although they can easily be rearranged.

| r0 | zero |
| --- | --- |
| r1 | a7 |
| r2 | (unused) |
| r3 | addr |
| r4 | data |
| r5 | rtn_addr |
| r6 | immed_data |
| r7 | base_disp (also called scaled_index) |
| r8 . . . r15 | d0 . . . d7 |
| r16 . . . r22 | a0 . . . a6 |
| r23 | (unused) |
| r24 | pc |
| r25 | sr_and_flags |
| r26 | ccr_x |
| r27 | prefetch_data |
| r28 | vbr |
| r29 | disp_table |
| r30 | code_ptr |
| r31 | EmulatorStatePtr |

The zero register contains a constant value of zero, it is never changed. Assigning this to register r0 is also convenient due to the POWER architecture base address quirk that does not allow r0 to be used as a memory base register.

The register d0 ... d7, a0 ... a7, pc, sr_and_flags, ccr_x, and vbr are used to hold corresponding 68020 register state. This is described in detail later in this document.

Registers addr, data, rtn_addr, immed_data, and base_disp are five temporary scratch registers used during the emulation of a 68020 instruction. Although they can be used for many different purposes, their names describe how they are used by effective address calculation routines, which are used during the emulation of many of the opcodes.

The prefetch_data register generally contains the sign extended 16 bit data value pointed to by the pc register.

The disp_table register points to an entry in the 512KB instruction dispatch table. The opcode being dispatched to is inserted into this register to index the table, this is described in more detail later.

The code_ptr register points to the beginning of the 64KB block of code that contains the emulation routines this block is 64KB aligned so that a 16 bit immediate value can be "or"ed with this register to point to any address with this 64KB block of code.

EmulatorStatePtr points to the base of the memory area that is used to store less frequently used emulator state that cannot be contained in the POWER registers.

The POWER special purpose lr register is available for use during the emulation of a 68020 instruction, and does not correspond to any 68020 register state.

The POWER special purpose ctr register is available for use during the emulation of a 68020 instruction, and does not correspond to any 68020 register state. It is used by convention to hold the address of the first POWER instruction to be executed to emulate the next 68020 instruction.

The POWER special purpose xer register is used to hold the V and C bits of the 68020 CCR register. It also contains the POWER SO bit, as well as the byte count to be used by POWER string instructions.

The POWER condition register cr is used to hold the N and Z bits of the 68020 CCR register. The low 16 bits are available for general use during the emulation of a 68020 instruction. The 4 bit condition register fields cr1 and cr2 are not used, the 4 bits of cr3 are used for global flags related to interrupts and special conditions which are described later.

68020 Register State Assignments

The 68020 has a number of general purpose and special purpose registers, some of which are only accessible in supervisor mode. All of these registers contents must be maintained by the emulator. In some cases, the bits in these registers may be distributed in a number of different places within the POWER architecture, but the emulator will gather/scatter the bits whenever it encounters a 68020 instruction that accesses the entire register. In other cases, there may be multiple copies of a register contents. Many of the special purpose registers are stored in memory pointed to by EmulatorStatePtr. The 68020 registers and their POWER locations are as follows.

| | |
|---|---|
| D0 ... D7 | d0 ... d7 |
| A0 ... A6 | a0 ... a6 |
| A7 | a7 (currently active stack pointer) |
| PC | PC (POWER version does not always point to executing instruction) |
| PC | trace_pc(EmulatorStatePtr) (valid when tracing enabled) |
| CCR | cr/xer/ccr_x (bits are distributed) |
| SR | sr_and_flags (upper byte of SR only) |
| USP | saved_usp(EmulatorStatePtr) (a7, when usp is active stack) |
| ISP | saved_isp(EmulatorStatePtr) (a7, when isp is active stack) |
| MSP | saved_msp(EmulatorStatePtr) (a7, when msp is active stack) |
| VBR | saved_vbr(EmulatorStatePtr) (duplicate copy in vbr) |
| SFC | saved_sfc(EmulatorStatePtr) |
| DFC | saved_dfc(EmulatorStatePtr) |
| CACR | saved_cacr(EmulatorStatePtr) |
| CAAR | saved_caar(EmulatorStatePtr) |

The 68020 registers d0 ... d7/a0 ... a6 are in POWER registers. The 68020 has three stack pointers, and the active stack pointer will be in register a7, while the remaining two inactive stack pointers will reside in memory. The memory copy of the active stack pointer is not used and inconsistent while that stack pointer is selected as the active stack pointer. When the selection of the active stack pointer is changed, the register copy of the old stack pointer will be written to memory, and the new register copy of the active stack pointer will be read from memory. It should be noted that register a7 is assigned to POWER register rl, which is register used for the native POWER stack pointer. This is to allow a single stack model in a mixed emulated and native environment.

In the 68020, the pc generally points to the beginning of the instruction that is currently being executed. During emulation, the pc register advances as the instruction is decoded and executed, and generally points somewhat past the beginning of the instruction being executed. At the beginning of the execution of an instruction, the pc always points two bytes (16 bits) past the beginning of the instruction, which may actually point to the next instruction. Since this offset is constant, it is always possible to compute the actual pc at an instruction boundary. When the 68020 instruction trace mode is active, the exception frame that is generated after the execution of a traced instruction needs to contain the pc of the beginning of the instruction that has just completed. Since it is generally not possible to compute the size of the instruction that just completed, or worse yet, it may have been a branch instruction which computed a completely new pc, there is a memory copy called trace_pc. When trace mode is active, the pc of an instruction that is about to execute is save in the memory based trace_pc, so that the starting pc of the instruction can be determined when the instruction completes. Since there is a performance penalty associated with this computation and updating, this is only performed when trace mode is enabled.

The 68020 CCR register consists of five condition code bits, called X, N, Z, V, and C. During emulation, these are treated as five separate bits which are in three different registers, instead of a single field of five bits. The X bit is stored in bit 2 of the POWER register named ccr_x. This bit position corresponds the position of the CA bit in the POWER special purpose XER register. The N bit is stored in bit 0 of the POWER cr register, this corresponds to the LT condition bit of cr0. The Z bit is stored in bit 2 of the or register, this corresponds to the EQ condition bit of cr0. The V bit is stored in bit 1 of the POWER special purpose XER register, which is the OV flag. The C bit is stored in bit 2 of the XER register, which is the CA flag. Most of the 68020 data movement and logical operations only update four of the five condition codes. They leave the X bit unchanged, set the N and Z bits to indicate if the result is negative or zero, and always clear the V and C bits. Using this arrangement, a single POWER instruction can move data from one register to another, and update some or all of these four bits of the CCR as follows.

| ao.  | dst,src,zero | ;# move data, update N,Z, clear V,C |
| or.  | dst,src,zero | ;# move data, update N,Z |
| ao   | dst,src,zero | ;# move data, clear V,C |
| caxo | dst,src,zero | ;# move data, clear V |
| a    | dst,src,zero | ;# move data, clear C |

Most of the 68020 arithmetic and shift operations update the X bit to the same value as the C bit. Since the C bit is in the XER register, a simple move from the XER register into the ccr_x register is all that is required to update the X bit. It should be noted that the 68020 X and C bits are set to 1 if there is a borrow during subtraction, while the POWER (and most other RISC processors) set the CA bit to 0 if there is a borrow during subtraction. This will require the CA bit to be complemented before saving it as the X and C bits. The same inversion is needed when the X bit is used as a borrow-in for the 68020 SUBX instruction. By using the following instruction pair, it is possible to perform a subtraction followed by an addition, which will set the CA flag to correspond to the 68020 conventions.

| sfo. | dst,src,dst | ;# dst <— dst-src, update N,Z,V |
| a    | tmp,dst,src | ;# update C, ignore result |

The upper byte of the 68020 SR register is stored in the low 8 bits (24 . . . 31) of the sr_and_flags register. The high 16 bits (0 . . . 15) of this register contain test-mode enable flags. Bit 20 is the flag_group_1_active bit which indicates that a group 1 exception (Bus Error or Address Error) is being processed, and is used to detect a Double Bus Fault situation. Bit 22 is the flag_odd_pc bit, which is used for Address Error detection. Bit 23 is the flag_trace_pending bit, which indicates that the 68020 instruction currently being executed is being traced, and needs to generate a trace exception when it completes.

Many of the 68020 special purpose registers that are accessed via the MOVEC instruction are stored in memory, because they are infrequently accessed, and there are not enough POWER registers available to hold all of them. An exception to this is the vbr register, there is a dedicated POWER register that is used to hold a copy of the vbr register contents, however the memory copy is also kept up to date. The various stack pointers are also an exception. Since only one of the three stack pointers can be selected at a time, the register a7 is used for the selected stack pointer, and the remaining two inactive stack pointers are stored in memory.

The Dispatch Table

The dispatch table is an indexed table of 65536 pairs of POWER instructions, which correspond to the entry points for the routines to emulate each of the 65536 possible 68020 instruction encodings. The first instruction of the pair will generally perform some operation related to source operand fetching or addressing. The second instruction of the pair is generally a branch instruction to an emulation routine which resides outside of this table. Since each pair of instructions will occupy 8 bytes, the total size of this table is 512K bytes. Currently this table is located at addresses $68000000 . . . $6807FFFF, and can reside in Read Only Memory (ROM). The register disp_table is used to address this table.

The alignment of the beginning of the table is very important, it needs to start at either the beginning of a 2MB boundary, or 512KB past the beginning. By having this 512KB block aligned to a 512KB address, the POWER Block Address Translation (BAT) registers can be used to perform the address translation of this fairly randomly accessed block of code, and eliminate potential thrashing of the TLBs.

The 512KB alignment also allows a single POWER instruction to index the table using the 68020 opcode times 8. The following instruction will shift the opcode left by 3 bits (multiply by 8), and insert it into the address of the base of the table, forming the address of the table entry for that opcode.

| rlimi | disp_table,opcode,3,0x0007FFF8 |

By having this table start in the first 1MB of a 2MB aligned boundary, where the second 1MB of addresses will cause an exception if accessed, it is possible to use an additional address bit to assist in the detection of Address Errors (see discussion later in this document).

The Emulation Routines

There is a block of 64K bytes allocated for the POWER instructions the Dispatch Table branches to. In general, the first two POWER instructions in the emulation of a 68020 instruction reside in the Dispatch Table, while the remaining instructions, which we refer to as the Emulation routines, reside in this block of code. Currently this block is located at addresses $68080000 . . . $6808FFFF, and can reside in Read Only Memory (ROM). The register code_ptr contains the address of the beginning of this block.

Just like the Dispatch Table, the alignment of the block of code for the Emulation routines is also very important, it needs to start at the beginning of a 64KB boundary.

In the emulator, it is frequently desirable to compute the address of an instruction within this block of code. The POWER architecture does not provide an instruction to compute a pc-relative address. The register code_ptr points to the beginning of the block, and there is a label in the source code called cb which marks the code base. To easily compute the address of any label within this 64KB block of code, the following instruction can be used.

| ori | addr,code_ptr,label-cb |

Within the 64KB block of code, there is additional attention paid to code alignment. The 601 processor cache has 32 byte cache blocks, and a cache line consisting of 2 cache blocks, or 64 bytes. To improve locality, and reduce the number of bytes of code that needs to be fetched when there is a cache miss, the routines are packed into nicely aligned 32 or 64 byte blocks.

68020 Instruction Prefetching

On the 601 processor, as well as most other RISC processors, there is some latency associated with memory read operations, and attempts to use the results of a load instruction, in the very next instruction will usually result in a pipeline stall. To improve performance, and minimize these stalls, it is very desirable to issue memory reads several instructions before attempting to use the data that they read.

Since the emulator needs to read all of the 68020 opcode and operand bytes in order to emulate an instruction, performance can be improved by issuing these reads long before the data is needed. To accomplish this, the emulator uses a register called prefetch_data to read (or pre-fetch) the next 16 bits (sign extended) of the instruction stream into, as soon as the current 16 bits have been consumed. The register pc is used to point to the position within the 68020 instruction stream that has been read. The POWER architecture provides an efficient instruction that can both advance the pc register, and read the data pointed to by the updated pc. The instruction is as follows, and there is also a macro called PREFETCH that is used within the emulator source code.

| lhau | prefetch_data,2(pc) |

The prefetched data is always read 16 bits at a time, and sign extended, because the 68020 opcodes and extension words are most often organized in 16 bit groups. The sign extension is useful for the addressing modes that use a 16 bit signed displacement that is added to an A-register or the PC register.

68020 Instruction Decoding

By using many of the concepts introduced above, the four basic steps required to decode and emulate a simple 68020 instruction can now be described. The four steps are referred to as DECODE1, DECODE2, PREFETCH, and DISPATCH. For simplicity, we will assume that this is a 16 bit opcode that does not perform any useful operation.

Since this is a very pipelined sequence of events, and we must start somewhere in the pipeline, we will begin at the first instruction in the dispatch table for this opcode, and after going through the remaining stages, we will see how we get back here after completing the remaining phases.

Upon entry, the following registers are setup as follows. The disp_table and ctr registers contains the address of the dispatch table entry for this opcode (the POWER address that we are currently executing at). The pc register points 2 bytes past the 68020 opcode that we are about to emulate. The prefetch_data register contains the sign extended 16 bit value that the pc register points to (in this example, it is the next 68020 opcode to be emulated).

The first phase is DECODE1, this phase is begins the decoding of the next 68020 instruction to be emulated. In this example, we are assuming that the current 68020 instruction consists of just a 16 bit opcode, and does not have any extension words. If there were extension words, they would need to be consumed by PREFETCHing, until prefetch_data contains the opcode of the next 68020 instruction, and pc points to that opcode. The DECODE1 operation takes the next 68020 opcode that is in the prefetch_data register, multiplies it by 8, and inserts it into the disp_table register, forming the address of the dispatch table entry for the next 68020 instruction. This is done in a single POWER instruction as follows, the macro DECODE1 performs this instruction.

| rlimi | disp_table,prefetch_data,3,0x0007FFF8 |

Since DECODE1 was the first of the two POWER instructions that reside in the dispatch table entry for this 68020 instruction, the second instruction must be a branch out of the dispatch table, and into an emulation routine. This is not considered to be one of the phases of the decoding process, but rather a necessity imposed by the two instruction limit with a dispatch table entry. In this example we will assume that this branch is as follows.

| b | continue |

The second phase is DECODE2, which in this example will occur in the first POWER instruction of the emulation routine. DECODE2 simply takes the dispatch table entry address that was computed by DECODE1, and moves it into the POWER ctr register. This is because the POWER branch instructions cannot branch to addresses contained in the general purpose registers, and can only branch to addresses in either the ctr or lr special purpose registers. The DECODE2 phase is done in a single POWER instruction as follows, the macro DECODE2 performs this instruction.

| mtctr | disp_table |

The third phase is PREFETCH, which in this example will occur in the second POWER instruction of the emulation routine. As described earlier, PREFETCH will advance the pc register by 2 bytes, and read the sign extended 16 bit value at that address into the prefetch_data register. We need to prefetch at this time, because we have consumed the previous contents of the prefetch_data register, which had contained the 16 bit 68020 opcode for next instruction to be emulated. This will setup the prefetch_data register with the first extension word (if any) associated with the next opcode, or the opcode of the instruction following the next instruction. As shown earlier, the PREFETCH phase is done in a single POWER instruction as follows, the macro PREFETCH performs this instruction.

| lhau | prefetch_data,2(pc) |

The fourth and final phase is DISPATCH, which in this example will occur in the third and fourth POWER instructions of the emulation routine. There are two POWER instructions needed for this phase, but in general the second one never gets executed. The DISPATCH phase completes the emulation of the current 68020 instruction, and begins the emulation of the next 68020 instruction. Since this marks the boundary between two 68020 instructions, any special processing that needs to occur between two 68020 instructions must happen here. Instruction Trace exceptions, and 68020 interrupt processing are examples of special events that need to be processed on instruction boundaries. There is a bit in the POWER cr register referred to as cr_special_event_pending, which gets set whenever any of this special handling is needed. How this bit gets set will be described later, but for now, lets just assume that it is cleared. Since the dispatch table entry address for the next 68020 instruction is already loaded into the POWER ctr register, the DISPATCH phase simply needs to branch to this address when there are no special events pending, or branch to a common routine to process pending special events. This final phase is done in two POWER instructions as follows, the macro DISPATCH performs these instructions.

```
bfc     cr_special_event_pending
b       process_special_event
```

By breaking the decoding and dispatching process into these simple phases, the instructions to perform the various phases can be distributed between other instructions within the emulation routines to execute in gaps where the processor would have otherwise stalled due to memory access latency.

Effective Address Computation

The 68020 architecture has a number of different addressing modes, some are very simple, and some can become very complex. Since the effective address, and the data that it points to, is generally needed very early in the emulation of a 68020 instruction, it is convenient to have a number of Effective Address Computation routines that can run be selected based upon the addressing mode, and a common emulation routine to implement the operation independent of the addressing mode used.

In some cases, the entire Effective Address Computation can occur in a single POWER instruction, and can be placed in the Dispatch Table. In other cases a short (or possibly long) subroutine is needed. Since there is only room for two instructions in the dispatch table, one method of performing a subroutine call would be to have the first instruction contain a call to the subroutine, which would return to the second instruction, which would be a branch to the emulation routine. This would result in a branch to a branch instruction, on the initial dispatch, and a branch to a branch instruction when returning from the Effective Address subroutine. This type of branching does not perform well on the POWER processor. It is more desirable to have the Effective Address calculation subroutine return directly to the @ first instruction of the emulation routine.

To reduce the number of branches, a slightly different subroutine calling convention is used. The first instruction in the dispatch table will load the address of the emulation routine into the register rtn_addr, and the second instruction will branch to the Effective Address subroutine. The subroutine will move the address of the emulation routine from rtn_addr into the lr, and when it returns, it will return to the emulation routine.
routine, the code_ptr register is used as a base address. An example of what the two instructions in the dispatch table may look like is as follows.

```
ori     rtn_addr,code_ptr,not_1_mem-cb
b       cea_1_30
```

There are some register conventions used by the effective address routines. As mentioned before rtn_addr is used to pass the return address, and may be used as a scratch register by the Effective Address routine. The register addr is used to return the effective address (if one is computed). The register data will contain the data that was read from the effective address (if it was a Fetch Effective Address routine), or will remain unchanged. The register immed_data is used to return the immediate operand, or opcode extension word that follows to opcode but precedes the Effective Address extension words, for Immediate/Extended Effective Address routines. The register base_disp is used as a scratch register.

The 68020 modes 6n and 73 indexed addressing modes can be very complex. In it's simplest form, any of the sixteen 68020 A/D registers can be used as an index. The index can be treated as a sign extended 16 bit quantity, or a full 32 bit value, and can be multiplied by 1, 2, 4, or 8, added to a base register, and added to a sign extended 8 bit displacement. Most of the information needed to compute the address is in a secondary extension word. There is an additional bit that indicates that even more complex addressing options are available. To quickly decode all of these options, there is a 256 entry table of instruction pairs that is at the beginning of the emulation routine code block. The code_ptr register points to the base of this indexed addressing mode decode table.

Address Error Processing

Since all instructions in the 68020 architecture are a multiple of two bytes long, the 68K does not allow instructions to begin on odd addresses. If a branch to an odd address is attempted, an Address Error exception is generated. Since this exception is an indication of a programming error, and is not a normal occurrence, the emulator would like to spend as little time as possible checking for this condition. There have been two methods used in the emulator to detect branches to odd addresses, each has different performance characteristics.

The first method (which is no longer used) consists of two phases, called CHECK_ODD_PC1 and CHECK_ODD_PC2. Each phase consisted of a single instruction. The first instruction would move the low bit of the pc register into bit 31 of the cr register. The second instruction would "or" bit 31 into the special event pending flag. This would cause the process_special_event routine to be entered if the new pc value was odd. That routine would check to see if the pc was odd, and generate an Address Error exception if it was. The POWER instructions used by the two phases are as follows.

```
mtcrf   0x01,pc
cror    cr_special_event_pending,cr_special_event_pending,31
```

The second method consists of a single phase, called CHECK_ODD_PC1, which is a single POWER instruction. This instruction will insert the low bit of the pc register into bit 11 of the disp_table register. Assuming that this is done before the DECODE2 phase, it will cause the DISPATCH phase to jump to an address that is 1MB past the Dispatch Table Entry that should have been used. This is an illegal address, and will cause an exception when the DISPATCH is attempted. The handler for this exception will notice that the bit in disp_table had been set, and will cause an Address Error exception to be generated. This method has less overhead than the first method when the pc is even, but significantly more overhead when the pc is odd. The single POWER used by this method is as follows.

```
rlimi   disp_table,pc,20,0x00100000
```

MOVEM Register List Optimizations

The 68020 MOVEM instruction has a 16 bit register list mask associated with it. There is one bit for each of the 16 A/D registers, indicating if the register should be moved. In general, the emulator would need to perform 16 individual tests of the bits to determine if the corresponding register needed to be read/written. This can be very time consuming. Due to compiler register allocation, parameter passing, and calling conventions, there are some registers that rarely appear in the register list of the MOVEM instruction, and others that are much more frequent. Taking advantage of this, the emulator can first check to see if any of the infrequent registers are on the list, using a bitwise "and" operation against the mask. If none of those bits were set, then there is a much smaller list of bits that need to be checked individually (7 instead of 16), which will improve performance. The infrequent registers that the emulator currently test for are d0–d3/a0–a1/a5–a7 and the frequent registers are d4–d7/a2–a4.

and the write will be to the same RAM location, and that there are no side effects (write protected or I/O space accesses), then it should be safe to omit the write, and just do the read. The table below shows the transformations.

| move.<b,w,l> | (an),(an)     | —> | tst.<b,w,l> | (an)          |
| move.<b,w,l> | –(an),(an)    | —> | tst.<b,w,l> | –(an)         |
| move.<b,w,l> | (an)+,–(an)   | —> | tst.<b,w,l> | (an)          |
| move.<b,w,l> | –(an),(an)+   | —> | tst.<b,w,l> | <1,2,4>(an)   |

Optimizations based on Opcode Synonyms

In the 68020 instruction set, there are many cases where two different opcode encodings perform exactly the same operation. Since the emulator can uniquely decode each of the 65536 possible opcode encodings, it can make sure that the dispatch table entries for two opcode synonyms are the same, and have exactly the same performance. Below is a list of instructions and their synonyms.

| add.<b,w,l>  | #imm,dn  | ≈ | addi.<b,w,l>  | #imm,dn      |
| adda.w       | #imm,an  | ≈ | lea.l         | imm(an),an   |
| addq.w       | #imm,an  | ≈ | addq.l        | #imm,an      |
| and.<b,w,l>  | #imm,dn  | ≈ | andi.<b,w,l>  | #imm,dn      |
| asl.<b,w,l>  | #1,dn    | ≈ | add.<b,w,l>   | dn,dn        |
| bra.s        | *+4      | ≈ | dbt.w         | dx,xxxx      |
|              |          |   |               | (32 bit nop) |
| bra.w        | d16      | ≈ | jmp           | d16(pc)      |
| bsr.w        | d16      | ≈ | jsr           | d16(pc)      |
| clr.l        | dn       | ≈ | moveq.l       | #0,dn        |
| cmp.<b,w,l>  | #imm,dn  | ≈ | cmpi.<b,w,l>  | #imm,dn      |
| lea.l        | (as),ad  | ≈ | movea.l       | as,ad        |
| lea.l        | abs.w,an | ≈ | movea.w       | #imm16,an    |
| lea.l        | abs.l,an | ≈ | movea.l       | #imm32,an    |
| movea.l      | (a7),a7  | ≈ | unlk          | a7           |
| or.<b,w,l>   | #imm,dn  | ≈ | ori.<b,w,l>   | #imm,dn      |
| sub.<b,w,l>  | #imm,dn  | ≈ | subi.<b,w,l>  | #imm,dn      |
| subq.w       | #imm,an  | ≈ | subq.l        | #imm,an      |

Optimizations Based on Operands

In many cases, opcodes that have the same register specified as both the source and destination behave the same as some other opcode which executes faster. For these opcodes, we create an optimized dispatch table entry which is the same as the simpler opcode, instead of using the dispatch table entry for the general case. The table below shows the transformations.

| and.<b,w,l>   | dn,dn     | —> | tst.<b,w,l>   | dn                      |
| cmp.<b,w,l>   | dn,dn     | —> | tst.l         | zero                    |
| cmpa.l        | an,an     | —> | tst.l         | zero                    |
| eor.<b,w,l>   | dn,dn     | —> | clr.<b,w,l>   | dn                      |
| exg.l         | rn,rn     | —> | nop           |                         |
| lea.l         | (an),an   | —> | nop           |                         |
| move.<b,w,l>  | dn,dn     | —> | tst.<b,w,l>   | dn                      |
| movea.l       | an,an     | —> | nop           |                         |
| movea.<w,l>   | (an)+,an  | —> | movea.<w,l>   | (an),an                 |
| or.<b,w,l>    | dn,dn     | —> | tst.<b,w,l>   | dn                      |
| sub.<b,w,l>   | dn,dn     | —> | clr.<b,w,l>   | dn (also clear ccr.x)   |

In many cases, memory to memory MOVE instructions that have the same source and destination addresses behave the same as a TST instruction. If we can assume that the read

Optimizations Based on Repeated Opcodes

There are many places in the Macintosh QuickDraw routines where data movement loops are "unwound" and contain 16 repeated sequences of the same instruction, followed by a DBRA looping instruction. There are also cases of shorter sequences in compiler generated code for structure copying. Since the emulation of a repeated sequence of 68020 opcodes will cause a repeated sequence of POWER instructions to be executed within the emulator, it is possible for the emulation of one of these opcodes to detect that the next opcode is the same, and eliminate some of the decoding and dispatching overhead, which will improve the performance of the subsequent instances of the same opcode. If instruction tracing or an interrupt is pending, this optimization cannot be performed, because special event processing would need to occur at the instruction boundaries. The opcodes that the emulator currently detects repeated sequence of are shown below.

| move.l | d6,(a1)+      |
| move.l | d6,(a5)+      |
| eor.l  | d6,(a5)+      |
| move.l | (a0)+,(a1)+   |
| move.l | (a0)+,(a2)+   |
| move.l | (a1)+,(a0)+   |
| move.l | (a2)+,(a1)+   |
| move.l | (a4)+,(a5)+   |

Optimizations Based on Opcode Sequences

In compiler generated code, and sometimes in the Macintosh ROM code there are common sequences of two and sometimes three instructions that occur frequently due to runtime calling conventions. In many cases detecting these sequences is done by having the emulation of the first instruction of the sequence check to see if it is followed by the second instruction of the sequence. For sequences of three instructions, if the pair of the first two had been detected, then the check for the third instruction can be made. The emulator currently detects and optimizes the following pairs and triples of instructions. As with other optimizations of this kind, the optimization cannot be performed if special events are pending. The sequences that the emulator may detect are shown below.

| move.b | (a1)+,(a0)+                   | bne.s | *–2         |
| move.b | (a0)+,d0                      | cmp.b | (a1)+,d0    |
| move.b | (a0)+,d1                      | cmp.b | (a1)+,d1    |
| move.l | (a7)+,(a7)                    | rts   |             |
| move.l | ([d16,ZA0,ZA0.w*1],d16),–(a7) | rts   |             |
| move.l | abs.w,–(a7)                   | rts   |             |

-continued

| movem.l | d16(a6),reg_list | unlk | a6 | rts |
| movem.l | (a7)+,reg_list | unlk | a6 | rts |

ATrap Dispatcher Acceleration

The Macintosh OS and Toolbox use the unimplemented LineA opcode space to encode system calls. The LineA dispatcher in the ROM executes several instructions (on every call) to dispatch to the desired routine. This whole process can be greatly improved by having the emulator directly dispatch these instructions. However, there must also be a way for this feature to be disabled if the standard LineA dispatcher has been replaced, such as when using the A-Trap record/break features of MacsBug. In order to achieve this compatibility, we need to know if the handler address (in vector offset $28) has changed. Fortunately, we do not have to worry about tracing, since the 68000 will not take a trace trap on a LineA (or any other unimplemented) instruction.

IV. Conclusion

This emulation technique is also optimized for an upgraded version of the POWER architecture, referred to as the POWER PC architecture. This updated version of the POWER architecture executes the same opcodes listed above for the POWER architecture instructions, except with different mnemonics.

Thus, a highly efficient method for decoding 68020 instructions in the POWER architecture processor, utilizing a special table of instruction sequences, specific sequences of instructions and other optimizations is provided. The alignment and method of indexing the table contribute to the high speed decoding of the 68020 instructions. In particular, a single POWER instruction can be used to index the table, by aligning the dispatch table on a 512K byte boundary within a two megabyte range, shifting the opcode left by three bits and inserting the shifted opcode into the address of the base of the table. Each entry in the table contains two power instructions. The first instruction generally performs an operation specific to source addressing mode, and the second instruction branches to an emulation routine which is generally independent of the source addressing mode. This allows reduced code size, and better memory reference and cache locality for the emulation routines.

There are four phases of the instruction decoding process. DECODE1 forms the address of the next dispatch table entry by shifting and inserting the next 68020 opcode into the address of the base of the dispatch table. DECODE2 moves that dispatch table address to the power architecture CTR register. PREFETCH reads the 16 bits (assigned extended to 32 bits) that follow the next 68020 instruction into a temporary holding register called prefetch_data. Finally, DISPATCH jumps to the address that was computed by DECODE1.

This sequence of four instruction macros is the minimum number of instructions in this embodiment of the invention that this task can be performed in on the POWER architecture, and the use of opcode prefetching reduces or eliminates pipeline stalls due to memory reference latency.

Overall, performance of an emulating guest instructions is enhanced by reducing the number of host instructions needed to be executed to emulate the guest instruction. One primary reason for this benefit is the direct access to the instructions in the dispatch table, combined with prefetching of the guest instructions.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. For a host processor which executes host instructions and includes a host processor addressable memory, a system for decoding guest instructions, comprising:

a sequence of guest instructions in said host processor addressable memory;

an emulation program store, in said host processor addressable memory, said emulation program store containing emulation programs, each of said emulation programs having a starting address within said emulation program store, each of said emulation programs including a host instruction routine for emulation of a particular guest instruction; and logic, within said emulation programs, which is implemented by decoding instructions that are executable by said host processor including an instruction to retrieve a next guest instruction in said sequence, and an instruction to determine one of said starting addresses in response to said next guest instruction by multiplying said next guest instruction by a constant value and by adding a base address of said emulation program store, and an instruction to jump directly to said emulation program store in response to said one of said starting addresses.

2. The system of claim 1, wherein said emulation program store comprises:

a dispatch store having dispatch entries beginning at said first addresses, respectively, each of said dispatch entries including a plurality of host instructions of one of said emulation programs corresponding to one of said guest instructions;

an emulation routine store having emulation entries beginning at a second of said addresses, respectively, each of said emulation entries including said host instruction routine for one of said guest instructions;

wherein said plurality of host instructions of said dispatch entries includes a host jump instruction which causes a jump upon execution by said host processor to one of said second addresses in said emulation routine store; and wherein each said host instruction routine includes host instructions which upon execution by said host processor form one of said first addresses to one of said dispatch entries in response to said next guest instruction and jump directly to said one of said dispatch entries.

3. The system of claim 2, further including:

a guest instruction pointer store for a guest instruction pointer indicating a guest instruction address in said sequence of guest instructions;

a prefetch guest instruction store for a guest instruction read from said sequence of guest instructions in response to said guest instruction pointer; and an emulation program pointer store for one of said first addresses formed in response to a current guest instruction read from said prefetch guest instruction store.

4. The system of claim 3, wherein each said host instruction routine in one of said emulation entries includes:

a first segment of host instructions which upon execution by said host processor forms said one of said first addresses in said emulation program pointer store in response to the current guest instruction in said prefetch guest instruction store;

a second segment of host instructions which upon execution by said host processor increments said guest instruction pointer and reads a next guest instruction from an address indicated by said guest instruction pointer into said prefetch guest instruction store; and a third segment of host instructions which upon execution by said host processor causes a jump to one of said emulation programs indicated by said one of said first addresses in said emulation program pointer store.

5. The system of claim 4, wherein said host processor includes a set of general purpose registers and a set of special purpose registers, and wherein said first segment of host instructions includes a first macro which causes formation of said one of said first addresses in one of said general purpose registers and a second macro which moves said one of said first addresses to said emulation program pointer store, and wherein said emulation program pointer store comprises one of said special purpose registers used by said host processor for jump addresses.

6. The system of claim 4, wherein a final instruction in one of said emulation programs causes a jump to said first address in said emulation program pointer store.

7. The system of claim 2, wherein two of said guest instructions are synonymous in that said two guest instructions perform the same operation, and wherein said dispatch entries for said two guest instructions consist of respective copies of a single plurality of host instructions at respective dispatch entries.

8. For a host processor, having host processor addressable memory, which executes host instructions, a system for decoding guest instructions, comprising:

a dispatch store, in said host processor addressable memory, having first addresses and dispatch entries beginning at said first addresses, respectively, each of said dispatch entries including a plurality of host instructions corresponding to one of said guest instructions;

an emulation routine store, in said host addressable memory, having second addresses and emulation entries beginning at said second addresses, respectively, each of said emulation entries including a host instruction routine for a function relating to emulation of one of said guest instructions;

wherein said plurality of host instructions of said one of said dispatch entries includes a host jump instruction which causes a jump upon execution by said host processor to one of said second addresses of a corresponding one of said emulation entries in said emulation routine store; and wherein said host instruction routines of said emulation entries include host instructions which upon execution by said host processor form one of said first addresses to one of said dispatch entries in response to a next guest instruction by multiplying said next guest instruction by a constant value and adding a base address of said dispatch store and jump to said one of said first addresses.

9. The system of claim 8, wherein said plurality of host instructions of said one of said dispatch entries includes a first instruction relevant to a guest instruction addressing mode and a second instruction identifying one of said second addresses of said one of said emulation entries.

10. The system of claim 8, wherein said plurality of host instructions of said dispatch entries includes a first instruction identifying one of said second addresses to said one of said emulation entries and a second instruction which upon execution by said host processor causes a jump to a guest effective address routine, and wherein said guest effective address routine includes a host instruction which causes a jump to said emulation entry identified by said first instruction.

11. The system of claim 8, further including:

a sequence of guest instructions in said host processor addressable memory;

a guest instruction pointer store for a guest instruction pointer indicating a guest instruction address in said sequence of guest instructions;

a prefetch guest instruction store for a guest instruction read from said sequence of guest instructions in response to said guest instruction pointer; and a dispatch pointer store for a dispatch store address formed in response to a guest instruction read from said prefetch guest instruction store.

12. The system of claim 11, wherein said host instruction routines of said emulation entries include:

a first segment of host instructions which upon execution by said host processor forms one of said first addresses in said dispatch pointer store in response to a guest instruction in said prefetch guest instruction store;

a second segment of host instructions which upon execution by said host processor increments said guest instruction pointer and reads a next guest instruction from an address indicated by said guest instruction pointer into said prefetch guest instruction store; and a third segment of host instructions which upon execution by said host processor causes a jump to said entry of said dispatch store indicated by said address in said dispatch pointer store.

13. The system of claim 12, wherein said host processor includes a set of general purpose registers and a set of special purpose registers, and wherein said first segment of host instructions includes a first macro which causes formation of said first address of said dispatch store in a general purpose register and a second macro which moves said first address which is formed by said first macro to said dispatch pointer store, and wherein said dispatch pointer store comprises a special purpose register used by said host processor for jump addresses.

14. The system of claim 8, further including:

a sequence of guest instructions stored in said host processor addressable memory;

a guest instruction pointer store for a guest instruction pointer indicating a guest instruction address in said sequence of guest instructions;

a prefetch guest instruction store for a guest instruction read from said sequence of guest instructions in response to said guest instruction pointer;

a dispatch pointer store for a dispatch address corresponding to one of said first addresses formed in response to a guest instruction read from said prefetch guest instruction store; and a return address store for one of said second addresses to one of said emulation entries; and wherein said plurality of first instructions of each of said dispatch entries includes a first instruction which writes one of said second addresses of the corresponding emulation entry to said return address store, and a second instruction which upon execution by said host processor causes a jump to a guest effective address routine, and wherein said guest effective address routine includes a host instruction which causes a jump to said second address stored in said return address store.

15. The system of claim 14, wherein said host processor includes a set of general purpose registers and a set of special purpose registers, and said return address store comprises a general purpose register in said set of general purpose registers, and wherein said guest effective address routine includes a first macro which moves said second address stored in said return address store to a particular member of said special purpose registers, and a second macro which causes a jump to said second address stored in said particular member of said special purpose registers.

16. The system of claim 8, wherein said host processor addressable memory includes a read-only memory array, and said dispatch store and said emulation routine store are comprised of said read-only memory array.

17. The system of claim 8, wherein two of said guest instructions are synonymous in that said two guest instructions perform the same operation, and wherein said dispatch entries for said two guest instructions consist of respective copies of a single plurality of host instructions at respective dispatch entries.

18. A system for decoding and executing guest instructions, comprising:
  a host processor which executes in response to host instructions, and includes a host processor addressable memory;
  a sequence of guest instructions stored in said host processor addressable memory;
  a dispatch table store, in said host processor addressable memory, having dispatch table store addresses and a set of dispatch entries, each of said dispatch entries in said set including a plurality of host instructions corresponding to one of said guest instructions;
  an emulation routine table store, in said host addressable memory, having emulation table addresses and a set of emulation entries beginning at said emulation table addresses, respectively, each of said emulation entries in said set including a host instruction routine for a function relating to emulation of one of said guest instructions;
  a guest instruction pointer store, coupled to said host processor, to store a guest instruction pointer indicating a guest instruction address in said sequence of guest instructions
  a prefetch guest instruction store, coupled to said host processor, to store a guest instruction read from said sequence of guest instructions in response to said guest instruction pointer; and
  a dispatch table pointer store, coupled to said host processor, to store one of said dispatch table store addresses formed in response to a guest instruction read from said prefetch guest instruction store;
  wherein said plurality of host instructions in a subset of said set of dispatch entries includes a host jump instruction which causes a jump upon execution by said host processor to one of said emulation routine table addresses of a corresponding emulation entry in said emulation routine table store; and wherein said host instruction routines in a subset of said set of emulation entries include
  a first segment of host instructions which upon execution by said host processor forms one of said dispatch table store addresses in said dispatch table pointer store in response to a guest instruction in said prefetch guest instruction store by multiplying said guest instruction by a constant value and by adding a base address of said dispatch table store;
  a second segment of host instructions which upon execution by said host processor increments said guest instruction pointer and reads a next guest instruction from an address indicated by said guest instruction pointer into said prefetch guest instruction store; and
  a third segment of host instructions which upon execution by said host processor causes a jump to one of said dispatch table entries indicated by said one dispatch table store address in said dispatch table pointer store.

19. The system of claim 18, wherein said plurality of host instructions in said set of said dispatch table entries includes a first instruction relevant to a guest instruction addressing mode and a second instruction identifying one of said emulation table addresses.

20. The system of claim 18, wherein said host processor includes a set of general purpose registers and a set of special purpose registers, and wherein said first segment of host instructions includes a first macro which causes formation of one of said dispatch table store addresses and storage in one of said general purpose registers and a second macro which moves one of said dispatch table store addresses to said dispatch table pointer store, and wherein said dispatch table pointer store comprises one of said special purpose registers used by said host processor for jump addresses.

21. The system of claim 18, further including:
  a return address store, coupled to said host processor, to store one of said emulation table addresses; and
  wherein said plurality of host instructions in said set of said dispatch entries include a first instruction which writes one of said emulation table addresses to said return address store, and a second instruction which upon execution by said host processor causes a jump to a guest effective address routine, and wherein said guest effective address routine includes a host instruction which causes a jump to said one emulation table address in said return address store.

22. The system of claim 21, wherein said host processor includes a set of general purpose registers and a set of special purpose registers, and said return address store comprises a general purpose register in said set of general purpose registers, and wherein said guest effective address routine includes a first macro which moves said one emulation table address in said return address store to a particular member of said set of special purpose registers, and a second macro which causes a jump to said emulation table address in said particular member of said set of special purpose registers.

23. The system of claim 18, wherein said host processor addressable memory includes a read-only memory array, and said dispatch table store and said emulation routine table store are comprised of said read-only memory array.

24. The system of claim 18, wherein two of said guest instructions are synonymous in that said two guest instructions perform the same operation, and wherein said dispatch entries for said two guest instructions consist of respective copies of a single plurality of host instructions at respective dispatch entries.

25. A system for decoding and executing guest instructions, comprising:

a host processor which executes in response to host instructions, and includes a host processor addressable memory;

a sequence of guest instructions in said host processor addressable memory;

a dispatch store, in said host processor addressable memory, having dispatch store addresses and a set of dispatch entries, each of said dispatch entries in said set consisting of a first and a second host instruction corresponding to a guest instruction;

an emulation routine store, in said host addressable memory, having emulation routine store addresses and a set of emulation entries beginning at said emulation routine store addresses, respectively, each of said emulation entries in said set including a host instruction routine for a function relating to emulation of said guest instructions;

a guest instruction pointer store, coupled to said host processor, to store a guest instruction pointer indicating a guest instruction address in said sequence of guest instructions;

a prefetch guest instruction store, coupled to said host processor, to store a guest instruction read from said sequence of guest instructions in response to said guest instruction pointer; a dispatch table pointer store, coupled to said host processor, to store one of said dispatch store addresses formed in response to a guest instruction read from said prefetch guest instruction store; and a return address store, coupled to said host processor, to store one of said emulation routine store addresses;

wherein a first host instruction in a first subset of said set of dispatch entries causes an operation relevant to a guest addressing mode of a corresponding guest instruction, and a second host instruction in said first subset of said dispatch entries causes a jump upon execution by said host processor to one of said emulation routine store addresses of a corresponding one of said emulation entries in said emulation routine store;

wherein said first host instruction in a second subset of said set of dispatch entries loads said one emulation routine store address in said return address store identifying one of said emulation entries which stores a functional routine for the corresponding guest instruction, and said second host instruction in said second subset causes a jump upon execution by said host processor to said one of said emulation routine store addresses in said emulation routine store which stores a guest effective address calculation routine;

wherein said host instruction routines in a first subset of said set of emulation entries include a first segment of host instructions which upon execution by said host processor forms one of said dispatch store addresses in said dispatch table pointer store in response to a guest instruction in said prefetch guest instruction store by multiplying said guest instruction by a constant value and adding a base address of said dispatch store;

a second segment of host instructions which upon execution by said host processor increments said guest instruction pointer and reads a next guest instruction from an address indicated by said guest instruction pointer into said prefetch guest instruction store; and a third segment of host instructions which upon execution by said host processor causes a jump to one of said dispatch table entries indicated by said one dispatch store address in said dispatch table pointer store; and wherein said guest effective address calculation routine includes a host instruction which causes a jump to said one emulation routine store address in said return address store.

26. The system of claim 25, wherein said host processor includes a set of general purpose registers and a set of special purpose registers, and said dispatch table pointer store comprises one of said special purpose registers used by said host processor for jump addresses and said return address store comprises a general purpose register in said set of general purpose registers, and wherein said first segment of host instructions includes a first macro which causes formation of said one dispatch store address in one of said general purpose registers and a second macro which moves said one dispatch store address to said dispatch table pointer store, and wherein said guest effective address calculation routine includes a first macro which moves said one emulation routine store address in said return address store to a particular member of said set of special purpose registers, and a second macro which causes a jump to said one emulation routine store address in said particular member of said set of special purpose registers.

27. A system for decoding guest instructions for emulation in a computer system having a host processor that executes host instructions, said system comprising:

dispatch table store accessible by the host processor, said dispatch table store having a plurality of entries including an entry corresponding to a particular guest instruction of said guest instructions wherein said entry corresponding to said particular guest instruction contains a set of host instructions for execution by said host processor during emulation of said particular guest instruction;

emulation routine store accessible by said host processor, said emulation routine store containing a set of decoding instructions executed by said host processor during emulation of said guest instructions, wherein said decoding instructions include an instruction that determines an index into said dispatch table store in response to said particular guest instruction by converting said particular guest instruction into said index within said host processor, and wherein said decoding instructions includes an instruction that causes said host processor to directly access said host instructions contained in said dispatch table that correspond to said particular guest instruction according to said index.

28. The system of claim 27, wherein said emulation routine store also contains an emulation routine for emulating said particular guest instruction, said emulation routine providing a sequence of host instructions for execution during emulation of said particular guest instruction by said host processor.

29. The system of claim 28, wherein said host instructions contained in said entry corresponding to said particular guest instruction include an instruction for fetching a source operand of said particular guest instruction.

30. The system of claim 28, wherein said host instructions contained in said entry corresponding to said particular guest instruction include an instruction for determining an address for accessing a source operand of said particular guest instruction.

31. The system of claim 28, wherein said host instructions contained in said entry corresponding to said particular guest instruction include a branch instruction to said emulation routine for emulating said particular guest instruction.

32. The system of claim 28, wherein said instruction that determines said index into said dispatch table store comprises an instruction that loads a specialized address register in said host processor with said particular guest instruction multiplied by a constant value.

33. The system of claim 32, wherein said instruction that loads said specialized address register shifts said particular guest instruction at least one bit position according to said constant value.

34. The system of claim 32, wherein the instruction that loads the specialized address register in the host processor obtains the particular guest instruction from a specialized prefetch register in the host processor.

35. The system of claim 34, wherein the decoding instructions further include a prefetch instruction that prefetches the particular guest instruction into the prefetch register.

36. The system of claim 32, wherein the instruction that causes the host processor to directly access the host instructions contained in the dispatch table comprises a dispatch instruction that jumps directly to the entry in the dispatch table store specified by the specialized address register.

37. The system of claim 28, wherein one or more of the decoding instructions are contained in the dispatch table store.

38. The system of claim 28, wherein a top of said dispatch table store is aligned to a 512 kbyte boundary in a memory space accessible by said host processor.

39. The system of claim 28, wherein a top of said emulation routine store is aligned to a 64 kbyte boundary in a memory space accessible by said host processor.

* * * * *